United States Patent Office 2,748,732
Patented June 5, 1956

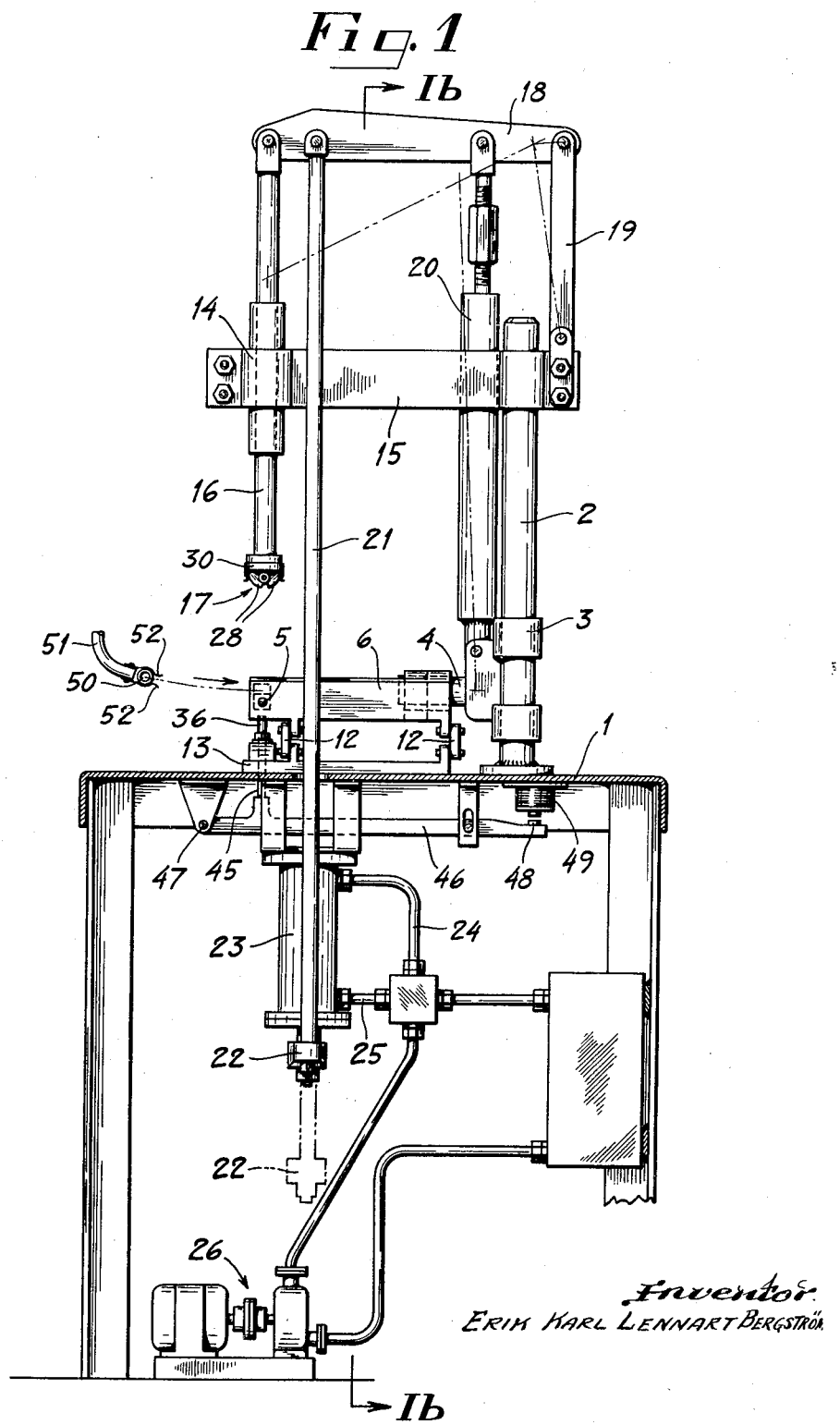

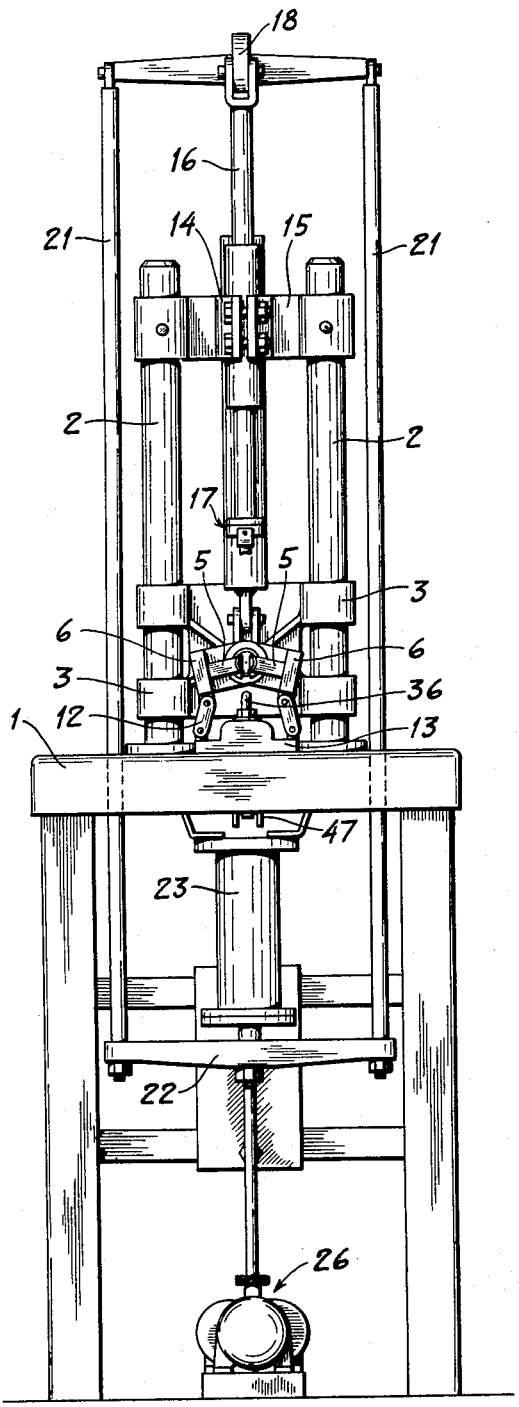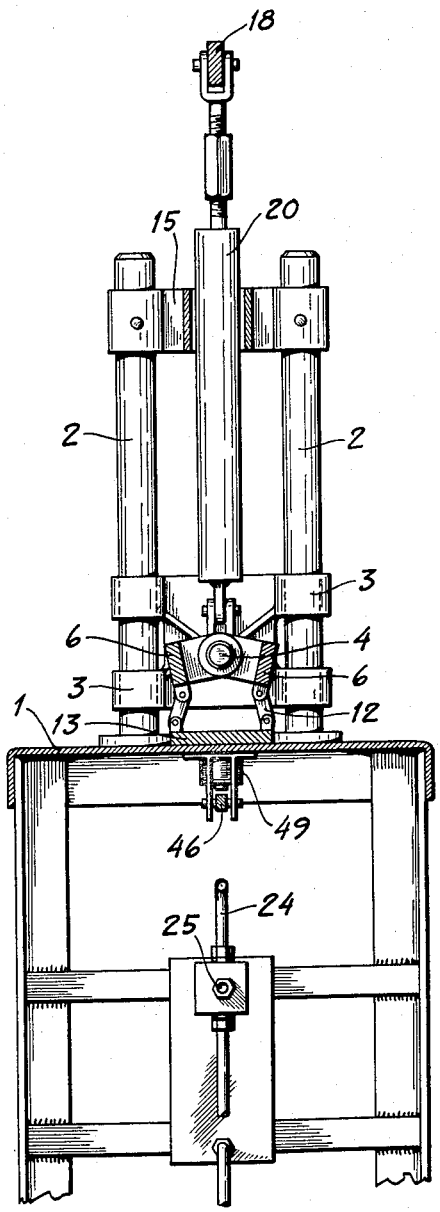

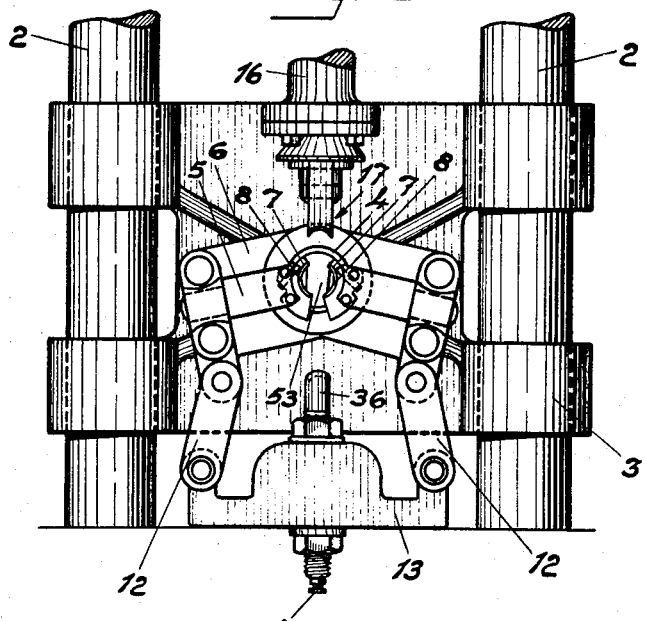
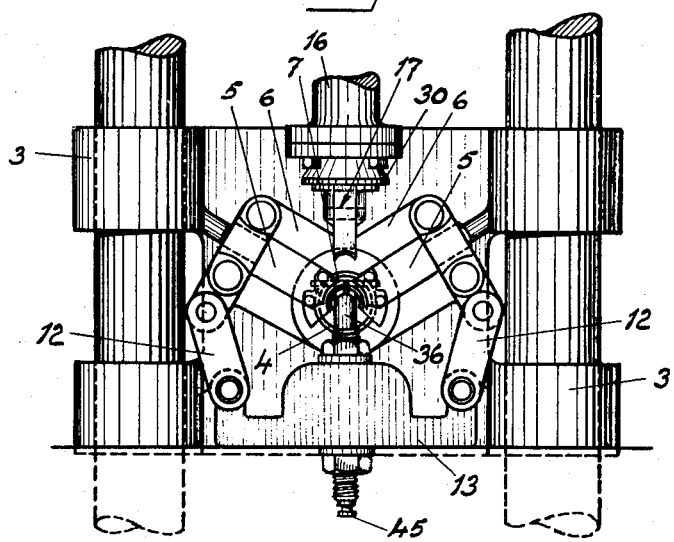

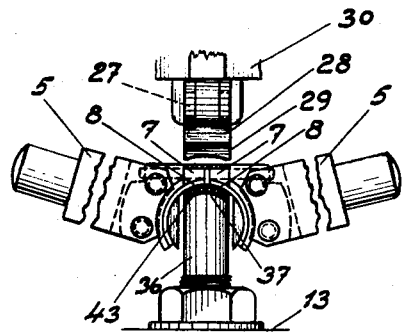
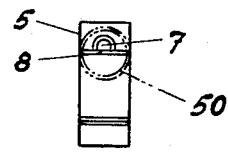
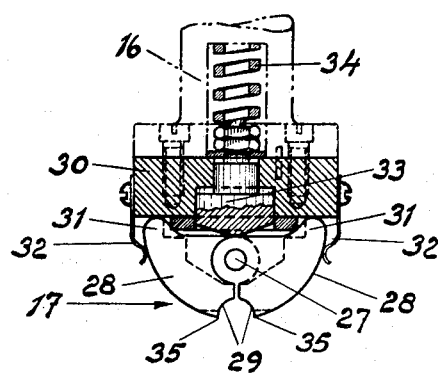
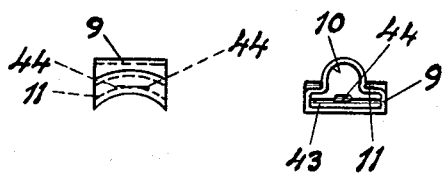

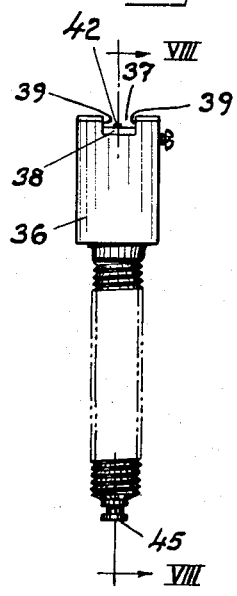
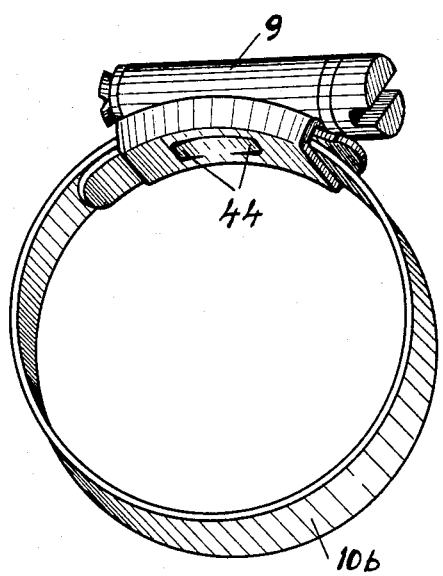
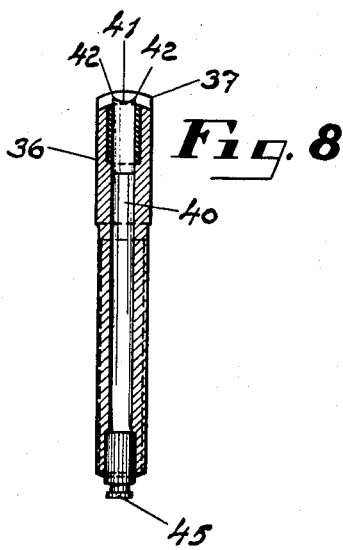
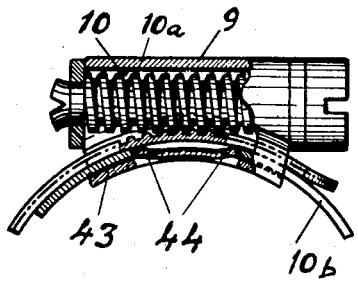

2,748,732

METHOD FOR MANUFACTURING SLEEVE SHAPED DETAILS AND AN APPARATUS FOR PERFORMING THE METHOD

Erik Karl Lennart Bergström, Stockholm, Sweden, assignor to Allmanna Brandredskapsaffaren Aktiebolag, Stockholm, Sweden, a corporation of Sweden Application April 21, 1954, Serial No. 424,734

9 Claims. (Cl. 113—1)

This invention relates to a method for manufacturing sleeve-shaped details having internal radii of curvature in two different planes. In particular, it relates to a method for manufacturing worm casings for hose clamps, having a substantially semi-cylindrical channel extending in the lengthwise direction of the sleeve for the reception of the worm of the hose clamp and an arcuate channel also extending in the lengthwise direction of the casing for the reception of both ends of a coiled steel band.

One object of the invention is to simplify the manufacture of the above mentioned worm casings for hose clamps which is obtained by having internal radii of curvature in two different planes, inserting two pressing punches from opposite sides in a sleeve cut from a drawn seamless tube, said pressing punches having a substantially semi-cylindrical part and a plate-shaped part joining the non-cylindrical part of the outer surface of the first mentioned part, pressing said sleeve by means of the plate-shaped parts of said punches into a recessed bedding of a die, and causing a pressing member to press the portions of the sleeve wall situated around the outside of the semi-cylindrical part of said pressing punches, thereby making said sleeve to conform with the shape of the punches.

Another object of the invention is to provide the casing in the bottom of the arcuated channel with a stop member for the detachable holding at the bottom of the end of the steel band which is close to the bottom. This is realized according to the invention thereby that a stamp punch is axially moved through the die after the bottom has been formed in the bedding of the die whereby said stamp punch is pressing up one or preferably two abutments from the stuff of the bottom.

Furthermore the invention relates to an apparatus for putting the method into practice.

In the following the invention is described and reference is had to the accompanying drawings substantially showing diagrammatically an apparatus for the manufacturing of worm casings for hose clamps.

Fig. 1 is a side view of the apparatus.

Figure 1a is a front view of the apparatus.

Figure 1b is a section on the line 1b—1b in Figure 1.

Fig. 2 is a front view of the forming parts of the apparatus, showing the same in a start position and Fig. 3 is a similar front view with the forming parts in a position just before a clamp member of the apparatus performs the final pressing of the sleeve blank.

Fig. 4 is an enlarged front view of the forming parts according to Fig. 3, showing in a vertical lengthwise section the sleeve blank just before the final press operation of the clamp member.

Fig. 5 is an end view of the right hand pressing tool in Fig. 4, seen from the left hand in this figure.

Fig. 6 is an enlarged vertical section through the die in Fig. 1.

Fig. 7 is a side view of the die of the apparatus according to Fig. 4 and

Fig. 8 is a vertical lengthwise section through the die on line VIII—VIII in Fig. 7.

Fig. 9 is an end view, and

Fig. 10 is a side view of the sleeve blank.

Fig. 11 is a side view of a finished hose clamp and

Fig. 12 is an end view of the same.

Fig. 13 is a perspective view of a hose clamp ready for use and

Fig. 14 is a side view, partly in lengthwise section, of the hose clamp.

A slide 3 is vertically displaceable to and from the stand 1 of the apparatus along up-standing parallel guide rods 2. Two arms 6 are swingably mounted with their inner ends about a horizontal forward directed (to the left in Figure 1) center hub 4. Each of said arms carries a forming tool 5. Each forming tool comprises a substantially semi-cylindrical part 7 and an arcuate, plate-shaped part 8, the latter being joined to the non-cylindrical portion of said semi-cylindrical part. The outer diameter of the punch 7 corresponds to the inner diameter of the straight channel 10 of the finished hose clamp 9 (Figs. 11 and 12) for the reception of the worm 10a (Fig. 12) of the hose clamp; and the width of the arcuate plate 8 corresponds to the internal width of the arcuate channel 11 of the hose clamp for the reception of the steel band 10b (Figs. 13 and 14) of the hose clamp. Each of the arms 6 are by means of a link 12 hingedly connected to the table plate 13 of the stand.

A press bar 16 which at its lower end carries a clamping member 17 is vertically displaceable in a bearing 14 on a bow 15 mutually connecting the guide rods 2 at their upper ends. The upper end of the press bar 16 is hingedly connected to a lever 18 which is hingedly connected to the bow 15 by means of a link 19. By means of an extensible push-and-pull bar 20 the lever 18 is hingedly connected to the slide 3. Two push-and-pull bars 21 are hingedly connected to the lever 18 near the point where the bar 16 is hinged to the arm, said bars are at their lower ends mutually connected to a bow 22 and which are displaced in a vertical direction by means of a double acting piston (not shown) which is displaceable in a cylinder 23. Conduits 24 and 25 for pressure medium from a hydraulic pump unit 26 are connected to the upper and lower ends of the cylinder 23. The flow of pressure liquid to the upper or lower end of said cylinder 23 is controlled by means of a pedal (not shown).

As shown particularly in Fig. 6 the clamping member 17 comprises two two-armed or bell crank levers 28 swingably mounted about a horizontal, common axis 27 the lower end of said levers forms a jaw with a recessed notch 29. The notch has a rounding which corresponds to the external rounding of that part of the finished casing which is provided with the channel 10. At the lower end of the press bar 16 a press plate 30 is provided, against the underside of which the upper, rounded end 31 of the levers 28 of the clamping member is pressed by mean of a spring 32 which for the reason of simplicity is shown as a leaf spring. The axis 27 passes through a piston 33 which is displaceable upwardly in the press plate 30 against the action of a strong helical spring 34 causing the levers 28 to swing outwards and the lower grasping edges 35 of the jaws to be gripping.

Below the press bar 16 a die 36 is secured to the table plate in the lengthwise direction of the bar 16 said die being adjustable in height relative to the table plate. A recessed bedding 37 with an arcuate bottom 38 and up-standing side walls 39 is provided at the upper end of the die. The distance between the walls 39 corresponds to the greatest width of the finished worm casing of the hose clamp 9.

A stamp punch 40 having a substantially rectangular end surface 41 is axially displaceable in the die 36.

The lengthwise axis of said end surface extends in the lengthwise direction of the bedding 37 and the short sides of the surface are shaped to cutting edges 42 adapted to cut through the stuff at the bottom 43 of the arcuate channel 11 (Fig. 11) for producing two stop shoulders or abutments 44 projecting into the channel 11. The lower end 45 of the stamp punch 40 is hingedly connected to a lever 46 (Fig. 1) the one end of which is swingably mounted on a shaft 47 on the stand 1 and the other end of which is provided with an armature 48 of an electro-magnet 49. A switch is inserted in the circuit thus formed, to a source of current which switch preferably may be connected in such a manner to an instrument which records the pressure in the cylinder 23 that when the pressure exceeds a certain value the switch is switched on and the electro-magnet 49 is charged. The attraction of the armature 48 causes the stamp punch to be pressed upwardly with a high speed, whereby the cutting edges 42 project into the bedding 37.

The apparatus comprises also a device for the feeding of the sleeve blanks 50 (Figs. 1, 9 and 10) into the apparatus which feeding device preferably consists of a feeding arm 51 which is swingably mounted and which is provided at its lower, free end with a grasping member which consist of two leaf springs 52.

In the embodiment shown in the drawings the sleeve blanks are supposed to be introduced one by one between the springs 52 whereupon the sleeve by means of the feeding arm 51 is swung into the space 53 (Fig. 2) between the free ends of the punches 7 when the slide 3 occupies the upper position as shown in Fig. 2. The sleeve 50 then is in a horizontal position with its ends facing the free ends of the punches 7 (see in particular Fig. 5). When the pressure liquid by depressing the pedal (not shown) is pressed through the conduit 24 into the cylinder 23, the lever 18 is by means of the pull bars 21 swung counter-clockwise according to Fig. 1. As the hinge point of the pull bars 21 on the lever 18 is positioned at a greater distance from the axis of oscillation of the same on the swivel rod 19 than from the hinge point of the pull bar 20 on the arm 18, the press bar 16 with the clamping member 17 will be displaced downwards with a greater rapidity than the slide 3 with the pressing parts of the same. The displacement of the slide 3 downwards causes due to the special bearing of the arms 6 and their connection by means of the links 12 with the press table 13, the forming tools 5 to be swung, the right one counter-clockwise and the left one clockwise to the position shown in Fig. 3. During this swing movement the portions of the punches comprising the semi-cylindrical part 7 and the plate-shaped part 8 are inserted from opposite sides into the sleeve 50, and as soon as this engagement is a fact the feeding arm 51 is swung back to its start position whereby the springs 52 are bent apart by the sleeve, the latter remaining at the punches 7. This sleeve is by the displacement of the slide 3 pressed down in the bedding 37 by means of the plates 8 whereby the lower arcuate part of the casing of the hose clamp is formed. The clamping member 17 has now reached the sleeve and presses with the arcuate surfaces 29 of the levers 28 the stuff of the sleeve around the punches 7. When during the downwards pressing of the press plate 8 at the final part of the lowering movement of the press bar 16 the levers 28 are swung outwards with their outer ends 31 the gripping edges 35 of the jaws are swung in a direction towards each other and press the stuff of the sleeve 50 with force into the angle between the punches 7 and the plates 8 (Fig. 5). During the pressing operation the pressure in the cylinder 23 increases and when the pressure has reached a certain value, the switch to the electro-magnet 40 is automatically closed. The electro-magnet causes the stamp punch 40 to press up with force the shoulders or abutments 44 in the bottom 43 of the casing. The flow of pressure liquid is inverted by means of the pedal so that the lower end of the cylinder 23 will be under pressure which causes the different parts of the apparatus to go back to the start position (Figs. 1 and 2). The finished casing 9 may then be removed from the space 53. This operation may be made manually but the apparatus is preferably provided with a device for the automatic ejection of the manufactured details from the apparatus in the moment when the movable parts of the same have reached the position shown in Fig. 2.

The embodiment, shown and described is but an example and the various parts of the apparatus may be varied in many ways without the scope of the invention. In particular the devices for the swinging of the forming tools 5 and for the movement of the clamping member 17 may be varied in many ways.

The invention is not limited to the manufacturing of casings for hose clamps. The method according to the invention may be used for the manufacturing of other sleeve-formed details, having internal radius of curvature in two different planes.

What I claim is:

1. A method for manufacturing sleeve-shaped details having internal radii of curvature in two different planes, comprising the steps of: inserting two pressing punches from opposite sides into the ends of a sleeve cut from a drawn seamless tube, the inserted portion of each of said punches having a substantially semi-cylindrical part and a plate-shaped part joined to the non-cylindrical portion of said semi-cylindrical part, pressing said sleeve by means of the plate-shaped parts of said punches into a recessed bedding of a die, and causing a pressing member to press the portions of the sleeve wall situated around the outside of the semi-cylindrical part of said pressing punches, whereby to make said sleeve conform with the shape of the punches.

2. A method for manufacturing sleeve-shaped details having internal radii of curvature in two different planes, comprising the steps of: inserting two pressing punches from opposite sides into the ends of a sleeve cut from a drawn seamless tube, the inserted portion of each of said punches having a substantially semi-cylindrical part and a plate-shaped part joined to the non-cylindrical portion of said semi-cylindrical part, pressing said sleeve by means of the plate-shaped parts of said punches into a recessed bedding of a die, and a pressing member pressing the portions of the sleeve wall situated around the outside of the semi-cylindrical part of said pressing punches, thereby making said sleeve conform to the shape of the punches, and finally forcing a stamp punch with an edge at its free end axially through said die after the bottom of the sleeve has been formed in the bedding of said die, whereby said stamp punch is pressing up at least one abutment in the bottom of the casing thus formed.

3. An apparatus for manufacturing sleeve-shaped details, comprising two pressing punches mounted on a vertically movable slide and swingable towards each other about a common center hub, said pressing punches having a substantially semi-cylindrical part and a plate-shaped part joining the non-cylindrical part of the outer surface of the first-mentioned part, a die situated below and between said punches and having a recessed bedding, the width of said bedding exceeding the width of the plate-shaped part of said pressing punches with about twice the wall-thickness of the sleeve blank, and a clamping member having a recess opening downward and situated above said punches and opposite said die toward which it is movable, said clamping member and said die having a common vertical axis intersecting the longitudinal axis of said pressing punches.

4. An apparatus, as set forth in claim 3, comprising means for moving said pressing punches and said clamping member in such a way that said punches are swung to a co-axial position, the lower surfaces of said plate-shaped parts following substantially the bottom of the bedding of said die, just before the clamping member is pressed with its recess around the semi-cylindrical part of said punches.

5. An apparatus for manufacturing sleeve-shaped details, comprising two pressing punches mounted on a vertically moveable slide and swingable towards each other about a common center hub, said pressing punches having a substantialy semi-cylindrical part and a plate-shaped part joining the non cylindrical part of the outer surface of the first mentioned part, a die situated below and between said punches and having a recessed bedding, the width of said bedding exceeding the width of the plate-shaped part of said pressing punches with about twice the wall-thickness of the sleeve blank, and a clamping member having a recess opening downwards and situated above said punches and opposite to and movable toward said die, said clamping member and die having a common vertical axis intersecting the longitudinal axis of said pressing punches, a stamp punch axially guided in said die and at its upper end provided with an edge, said punch being adapted to strike upwards to a position where said edge projects into the bedding of said die.

6. An apparatus for manufacturing sleeve-shaped details, comprising two pressing punches mounted on a vertically movable slide and swingable towards each other about a common center hub, said pressing punches having a substantially semi-cylindrical part and a plate-shaped part joining the non cylindrical part of the outer surface of the first mentioned part, a die situated below and between said punches and having a recessed bedding, the width of said bedding exceeding the width of the plate-shaped part of said pressing punches with about twice the wall-thickness of the sleeve blank, and a clamping member having a recess opening downwards and situated above said punches and opposite to and movable toward said die, said clamping member and die having a common vertical axis intersecting the longitudinal axis of said pressing punches, said stamp punch having substantially rectangular upper end surface, the longitudinal axis of said surface extending in the longitudinal direction of said bedding, and the short sides of said surface being shaped as cutting edges for cutting through the bottom of the finished sleeve-shaped details.

7. An apparatus for manufacturing sleeve-shaped details, comprising two pressing punches mounted on a vertically moveable slide and swingable toward each other about a common center hub, said pressing punches having a substantially semi-cylindrical part and a plate-shaped part joining the non cylindrical part of the outer surface of the first mentioned part, a die situated below and between said punches and having a recessed bedding, the width of said bedding exceeding the width of the plate-shaped part of said pressing punches with about twice the wall-thickness of the sleeve blank, and a clamping member having a recess opening downwards and situated above said punches and opposite to and movable toward said die, said clamping member and die having a common vertical axis intersecting the longitudinal axis of said pressing punches, said pressing punches being arranged opposite each other on two levers, said levers with the inner ends being swingably mounted on a hub on said slide and with the outer ends hingedly connected to a link hingedly secured to the stand of the apparatus.

8. An apparatus for manufacturing sleeve-shaped details, comprising two pressing punches mounted on a vertically moveable slide and swingable toward each other about a common center hub, said pressing punches having a substantially semi-cylindrical part and a plate-shaped part joining the non cylindrical part of the outer surface of the first mentioned part, a die situated below and between said punches and having a recessed bedding, the width of said bedding exceeding the width of the plate-shaped part of said pressing punches with about twice the wall-thickness of the sleeve blank, and a clamping member having a recess opening downwards and situated above said punches and opposite to and movable toward said die, said clamping member and said die having a common vertical axis intersecting the longitudinal axis of said pressing punches, said clamping member comprising two levers swingably mounted about a common axis, the lower end of said levers being shaped as a jaw adapted to grip the sleeve blank and to press it against each side of said punches.

9. An apparatus as set forth in claim 8, in which said levers are shaped as bell crank levers, the lower ends of said levers being shaped as a jaw, said levers being adapted to be swung outwards and downwards with their upper ends by means of a vertically displaceable pressing plate with the axis about which said levers are pivoted remaining in a depressed position.

References Cited in the file of this patent

UNITED STATES PATENTS

| | | |
|---|---|---|
| 238,417 | Miller | Mar. 1, 1881 |
| 310,577 | Gilmore | Jan. 13, 1885 |
| 345,444 | Noble | July 13, 1886 |
| 1,469,296 | Davis | Oct. 2, 1923 |
| 1,613,170 | Henderson | Jan. 4, 1927 |
| 1,875,954 | Taylor | Sept. 6, 1932 |
| 1,923,272 | Maroto | Aug. 22, 1933 |
| 2,670,524 | Frank | Mar. 2, 1954 |

FOREIGN PATENTS

| | | |
|---|---|---|
| 23,242 | Great Britain | Oct. 27, 1903 |
| 704,810 | Germany | Apr. 7, 1941 |